(12) United States Patent
Han et al.

(10) Patent No.: US 9,381,788 B2
(45) Date of Patent: Jul. 5, 2016

(54) AIR CONDITIONER FOR VEHICLE

(75) Inventors: Seongseok Han, Daejeon-si (KR);
Seonghyun Kim, Daejeon-si (KR);
Donggyun Kim, Daejeon-si (KR);
Hyungjoo Kim, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1081 days.

(21) Appl. No.: 13/367,590

(22) Filed: Feb. 7, 2012

(65) Prior Publication Data

US 2012/0208444 A1 Aug. 16, 2012

(30) Foreign Application Priority Data

Feb. 15, 2011 (KR) .................. 10-2011-0013368
Feb. 6, 2012 (KR) .................. 10-2012-0011644

(51) Int. Cl.
*B60H 1/00* (2006.01)
(52) U.S. Cl.
CPC ........ *B60H 1/00692* (2013.01); *B60H 1/00671* (2013.01); *B60H 2001/00728* (2013.01)
(58) Field of Classification Search
CPC ........... B60H 1/00671; B60H 1/00692; B60H 2001/00728
USPC .......................................................... 454/141
See application file for complete search history.

(56) References Cited

U.S. PATENT DOCUMENTS

| | | | | |
|---|---|---|---|---|
| 6,048,263 A * | 4/2000 | Uchida | ............ | B60H 1/00064 165/204 |
| 6,224,480 B1 * | 5/2001 | Le | ............ | B60H 1/00692 454/156 |
| 6,305,462 B1 * | 10/2001 | Tsurushima | ......... | B60H 1/0005 165/103 |
| 6,347,988 B1 * | 2/2002 | Kurokawa | ............ | E05F 15/635 165/42 |
| 6,450,246 B1 | 9/2002 | Kurokawa et al. | | |
| 6,453,991 B1 * | 9/2002 | Tsurushima | ....... | B60H 1/00064 165/202 |
| 6,508,703 B1 * | 1/2003 | Uemura | ............ | B60H 1/00692 251/901 |
| 6,569,009 B2 * | 5/2003 | Nishikawa | ......... | B60H 1/00692 454/121 |
| 6,609,563 B1 * | 8/2003 | Tsurushima | ....... | B60H 1/00692 165/202 |
| 6,814,138 B2 * | 11/2004 | Tsurushima | ....... | B60H 1/00692 165/202 |
| 7,527,551 B2 * | 5/2009 | Goupil, Jr. | ......... | B60H 1/00692 165/43 |
| 7,540,321 B2 * | 6/2009 | Simmet | ............. | B60H 1/0005 165/103 |
| 7,694,729 B2 * | 4/2010 | Uemura | ............ | B60H 1/00692 165/202 |

(Continued)

FOREIGN PATENT DOCUMENTS

DE 102005063235 A1 2/2007
EP 1 088 688 A2 4/2001

(Continued)

*Primary Examiner* — Steven B McAllister
*Assistant Examiner* — Frances F Hamilton
(74) *Attorney, Agent, or Firm* — Norton Rose Fulbright US LLP

(57) ABSTRACT

The present invention relates to an air conditioner for a vehicle. The air conditioner for a vehicle according to the present invention includes: a plate member slidably operating inside an air-conditioning case to control the degree of opening of air outflow ports or air passageways inside the air-conditioning case; a gear shaft for operating the plate member, and separation preventing means formed on rail portions of the plate member interlocking with the gear shaft.
According to the present invention, the gear portions of the gear shaft can be smoothly interlocked with the gear holes formed on the rail portions of the plate member and it is prevented that the gear portions of the gear shaft in interlock with the gear holes of the rail portions are separated from the gear holes or mislocated.

15 Claims, 12 Drawing Sheets

(56) References Cited

U.S. PATENT DOCUMENTS

| | | | |
|---|---|---|---|
| 8,777,705 B2* | 7/2014 | Nomura | B60H 1/00692 454/160 |
| 8,840,452 B2* | 9/2014 | Han | B60H 1/00692 454/145 |
| 8,939,821 B2* | 1/2015 | Monoi | B60H 1/00692 165/204 |
| 2002/0197951 A1* | 12/2002 | Uemura | B60H 1/0005 454/121 |
| 2006/0046632 A1* | 3/2006 | Goupil | B60H 1/00692 454/121 |
| 2009/0032758 A1 | 2/2009 | Stevenson | |
| 2009/0197517 A1 | 8/2009 | Wang et al. | |
| 2010/0144263 A1* | 6/2010 | Han | B60H 1/00678 454/155 |
| 2011/0059685 A1* | 3/2011 | Ido | B60H 1/00692 454/69 |
| 2012/0180393 A1* | 7/2012 | Suzuki | B60H 1/00692 49/348 |
| 2013/0160368 A1* | 6/2013 | Makita | B60H 1/00692 49/209 |
| 2015/0038067 A1* | 2/2015 | Byon | B60H 1/00021 454/160 |

FOREIGN PATENT DOCUMENTS

| | | |
|---|---|---|
| JP | 9290618 A | 11/1997 |
| JP | 11-240321 A | 9/1999 |
| JP | 2002079819 A | 3/2002 |
| JP | 2003127638 A | 5/2003 |
| JP | 2004276668 A | 10/2004 |
| KR | 1020040102760 A | 12/2004 |
| KR | 20090069614 A | 7/2009 |

* cited by examiner

Prior Art

Prior Art

AIR CONDITIONER FOR VEHICLE

This application claims priority under 35 U.S.C. §119 from Korean Patent Application No. 10-2011-0013368 filed Feb. 15, 2011 and Korean Patent Application No. 10-2012-0011644 filed Feb. 6, 2012, each of which are incorporated herein by reference in its entirety for all purposes.

BACKGROUND OF THE INVENTION

1. Field of the Invention

The present invention relates to an air conditioner for a vehicle, and more particularly, to an air conditioner for a vehicle, which includes: a plate member slidably operating inside an air-conditioning case to control the degree of opening of air outflow ports or air passageways inside the air-conditioning case; a gear shaft for operating the plate member, and separation preventing means formed on lateral edge portions of the plate member interlocking with the gear shaft.

2. Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

According to mounted structures of a blower unit, an evaporator unit and a heater core unit, such an air conditioner is classified into a three-piece type air conditioner where the blower unit, the evaporator unit, and the heater core unit are disposed independently, a semi-center type air conditioner where the evaporator unit and the heater core unit are embedded in an air-conditioning case and the blower unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

FIG. 1 illustrates the semi-center type air conditioner. In FIG. 1, the air conditioner 1 includes; an air-conditioning case 10 having an air inflow port 11 formed on an inlet thereof and a defrost vent 12a, a face vent 12b and floor vents 12c and 12d mounted on an outlet thereof in such a way as to be adjusted in degree of openings by mode doors 16; a blower (not shown) connected to the air inflow port 11 of the air-conditioning case 10 for sending inside air or outside air; an evaporator 2 and a heater core 3 that are mounted on air passageways in the air-conditioning case 10; and a temperature-adjusting door 15 mounted between the evaporator 2 and the heater core 3 for adjusting the degree of opening of a cold air-passageway P1, which bypasses the heater core 3, and a warm air passageway P2, which passes through the heater core 3.

Furthermore, the floor vents 12c and 12d are divided into a floor vent 12c for a front seat and a floor vent 12d for a rear seat.

Moreover, the temperature-adjusting door 15 and the mode doors 16 respectively include rotary shafts 15b and 16b rotatably mounted on both side walls of the air-conditioning case 10 and plates 15a and 16a formed at one side of the rotary shafts 15b and 16b. In this instance, for the mode door 16, a center pivot door having the plates 16a formed at both sides of the rotary shaft 16b may be used.

The temperature-adjusting door 15 and the mode doors 16 are respectively connected to a cam (not shown) or a lever (not shown), which is actuated by an actuator (not shown) mounted on an outer surface of the air-conditioning case 10, and rotatably operated to thereby adjust the degree of opening of the cold and warm air passageways P1 and 92 or open or close the vents 12a to 12d.

In addition, as shown in FIGS. 1 and 2, the temperature-adjusting door 15 and the mode doors 16 further include sealing members 15c and 16c attached to the edges of the plates 15a and 16a. The sealing members 15c and 16c are in close contact with the air-conditioning case 10 to improve sealability when the doors 15 and 16 close the corresponding passageways.

According to the air conditioner 1 having the above structure, in the case of the greatest cooling mode, the temperature-adjusting door 15 opens the cold air passageway P1 and closes the warm air passageway P2. Accordingly, the air blown by a blower (not shown) is converted into cold air by heat-exchanging with refrigerant flowing inside the evaporator 2 while passing through the evaporator 2, and then, flows toward a mixing chamber (MC) through the cold air passageway P1. After that, the converted air is discharged to the inside of the vehicle through the vents 12a to 12d opened by a predetermined air-conditioning mode, whereby the inside of the vehicle is cooled.

Moreover, in the case of the greatest heating mode, the temperature-adjusting door 15 closes the cold air passageway P1 and opens the warm air passageway P2. Accordingly, the air blown by the blower (not shown) passes through the evaporator 2, is converted into warm air by heat-exchanging with cooling water flowing inside the heater core 3 while passing through the heater core 3 through the warm air passageway P2, and then, flows toward the mixing chamber (MC). After that, the converted air is discharged to the inside of a vehicle through the vents 12a to 12d opened by the predetermined air-conditioning mode, whereby the inside of the vehicle is heated.

In the meantime, in the case, of not the greatest cooling mode but a half cooling mode, the temperature-adjusting door 15 is rotated to a neutral position, and opens ail of the cold air passageway P1 and the warm air passageway P2 relative to the mixing chamber (MC). Accordingly, the cold air passing through the evaporator 2 and the warm air passing through the heater core 3 flow toward the mixing chamber (MC) and are mixed with each other, and then, are discharged to the inside of the vehicle through the vents 12a to 12d opened by the predetermined air-conditioning mode.

As shown in FIG. 2, the temperature-adjusting door 15 has a sealing member 15c to increase sealability, but has a problem in that it generates a bad smell because of inhabitation of molds on the sealing member 15c.

Furthermore, since the sealing member 165c mounted on the temperature-adjusting door 15 is very expensive and requires much time to mount it to the mode temperature-adjusting door 15, the manufacturing price is increased.

Moreover, since the plate 15a of the temperature-adjusting door 15 has a predetermined thickness to allow mounting of the sealing member 15c, the temperature-adjusting door 15 is very heavy and needs great material costs by weight.

In addition, the temperature-adjusting door 15 has another problem in that the size of the air conditioner is increased because the temperature-adjusting door 15 must secure a predetermined turning radius in order to be operated.

SUMMARY OF THE INVENTION

Accordingly, the present invention has been made to solve the above-mentioned problems occurring in the prior arts, and it is an object of the present invention to provide an air-conditioner for a vehicle, which includes: a plate member slidably operating inside an air-conditioning case to control degree of opening of air outflow ports or air passageways inside the air-conditioning case; a gear shaft for operating the plate member, and separation preventing means formed on lateral edge portions of the plate member interlocking with the gear shaft, thereby allowing the gear shaft and the plate member to be interlocked with each other smoothly, preventing gear portions of the gear shaft from being separated from gear holes formed on the lateral edge portions of the plate member, enhancing assemblability between the gear shaft and the plate member by having an introduction portion formed at one end portion of the lateral edge portion of the plate member, reducing the number of components, weight and manufacturing costs and enhancing durability due to a simple structure of the door, reducing the size of the air conditioner, and preventing bad smells caused by inhabitation of molds because the plate member is used.

To accomplish the above object, according to the present invention, there is provided an air conditioner for a vehicle including; an air-conditioning case having an air inflow port formed on one side thereof and a plurality of air outflow ports formed on the other side thereof for discharging air which is introduced through the air inflow port; doors each having a gear shaft rotatably mounted inside the air-conditioning case and a plate member slidably mounted inside the air-conditioning case to control degree of opening of the air outflow ports or an air passageway inside the air-conditioning case, the gear shaft including gear portions, the plate member including lateral edge portions each of which is formed on at least one end portion of the plate member and has a plurality of gear holes in such a way as to be interlocked with the gear portions of the gear shaft; and separation preventing means formed on the lateral edge portion of the plate member to prevent the gear portion interlocked with the gear holes of the lateral edge portion from being separated from the gear hole and to guide the gear portion to be smoothly interlocked with the gear holes.

In another aspect of the present invention, there is provided an air conditioner for a vehicle including: an air-conditioning case having an air inflow port formed on one side thereof and a plurality of air outflow ports formed on the other side thereof for discharging air which is introduced through the air inflow port; doors each having a gear shaft rotatably mounted inside the air-conditioning case and a plate member slidably mounted inside the air-conditioning case to control degree of opening of the air outflow ports or an air passageway inside the air-conditioning case, the gear shaft including gear portions, the plate member including lateral edge portions each of which is formed on at least one end portion of the plate member and has a plurality of gear holes in such a way as to be interlocked with the gear portions of the gear shaft; bending portions that are formed at both end portions of the plate member in a sliding direction; and an introduction portion that is formed on each of the bending portion and formed by the bending portion partially cut in such a fashion that the gear portion of the gear shaft is smoothly introduced into the lateral edge portion of the plate member when the plate member is slidably mounted inside the air-conditioning case to which the gear shaft is previously assembled.

As described above, because the air conditioner for the vehicle according to the present invention includes: the plate member slidably operating inside the air-conditioning case to control the degree of opening of air outflow ports or air passageways inside the air-conditioning case; the gear shaft for operating the plate member, and guide ribs, which are separation preventing means, protrudingly formed on the lateral edge portions of the plate member interlocking with the gear shaft, the gear portions of the gear shaft can be smoothly interlocked with the gear holes formed on the lateral edge portions of the plate member and it is prevented that the gear portions of the gear shaft in interlock with the gear holes of the lateral edge portions are separated from the gear holes or mislocated.

Moreover, the plate member has bending portions formed at both end portions thereof, and hence, it can enhance strength of the thin plat member, prevent the plate member from being bent or transformed by wind pressure occurring inside the air-conditioning case, and prevent both end portions of the plate member from being caught to the inner surface (sealing groove) of the air-conditioning case when the plate member is slidably operated, in a vertical direction inside the air-conditioning case.

Furthermore, because the introduction portion is formed by cutting a portion of the bending portion corresponding to the lateral edge portion of the plate member, the gear portions of the gear shaft can be smoothly inserted into the lateral edge portions of the plate member, which is assembled by being pushed into the air-conditioning case, so that assemblability between the gear shaft and the plate member is enhanced.

Additionally, because each of the gear portions of the gear shaft includes a plurality of first gear teeth and two second gear teeth that are different in shape and interval from the first gear teeth, when the plate member is slidably inserted and mounted into the left and right cases of the air-conditioning case, to which the gear shaft is previously assembled, the gear shaft and the plate member can be simply assembled with each other at correct positions since they are assembled in interlock with each other starting from the second gear teeth of the gear portion.

In addition, because the guide portions are formed on the guide ribs located at an end portion of the lateral edge portion in such a fashion that a gap between the guide ribs at the guide portions is widened outwardly, when the plate member is slidably assembled into the air-conditioning case to which the gear shaft is previously assembled, the gear portions of the gear shaft are easily guided into the gear holes of the lateral edge portions, whereby assemblability is enhanced.

Moreover, because the entire structure of the doors is simple, the present invention can reduce the number of components, weight and manufacturing costs, enhance durability, reduce the size of the air conditioner, and prevent bad smells caused by inhabitation of molds since the plate member is used.

Furthermore, because the width of the rail, groove portion is larger than the thickness of the plate member and a plurality of protrusions which are in slidable contact with one side of the rail groove portion are formed on one side of the lateral edge portion of the plate member inserted into the rail groove portion, the plural protrusions formed on the lateral edge portion get in point contact with one side of the rail groove portion, and hence, it can minimize friction between the plate member and the rail, groove portion and reduce a load of an actuator, which operates the plate member and the gear shaft.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
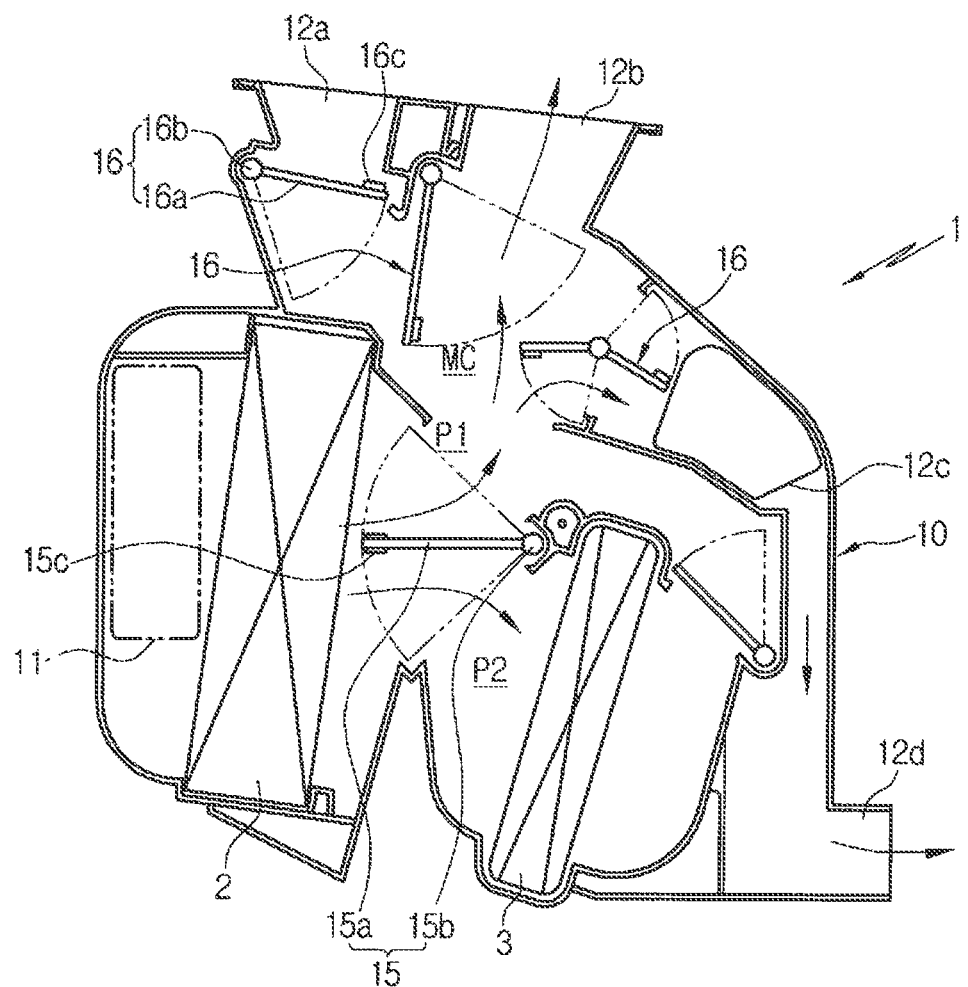
FIG. 1 is a sectional view showing an air conditioner for a vehicle according to a prior art.
Figure 2:
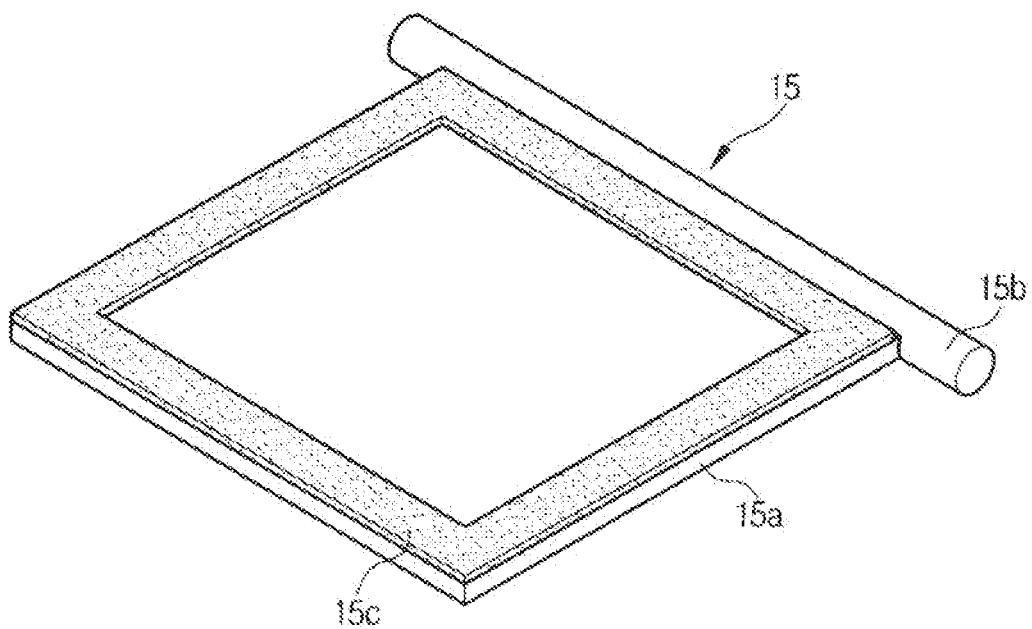
FIG. 2 is a perspective view showing a temperature-adjusting door in FIG. 1.
Figure 3:
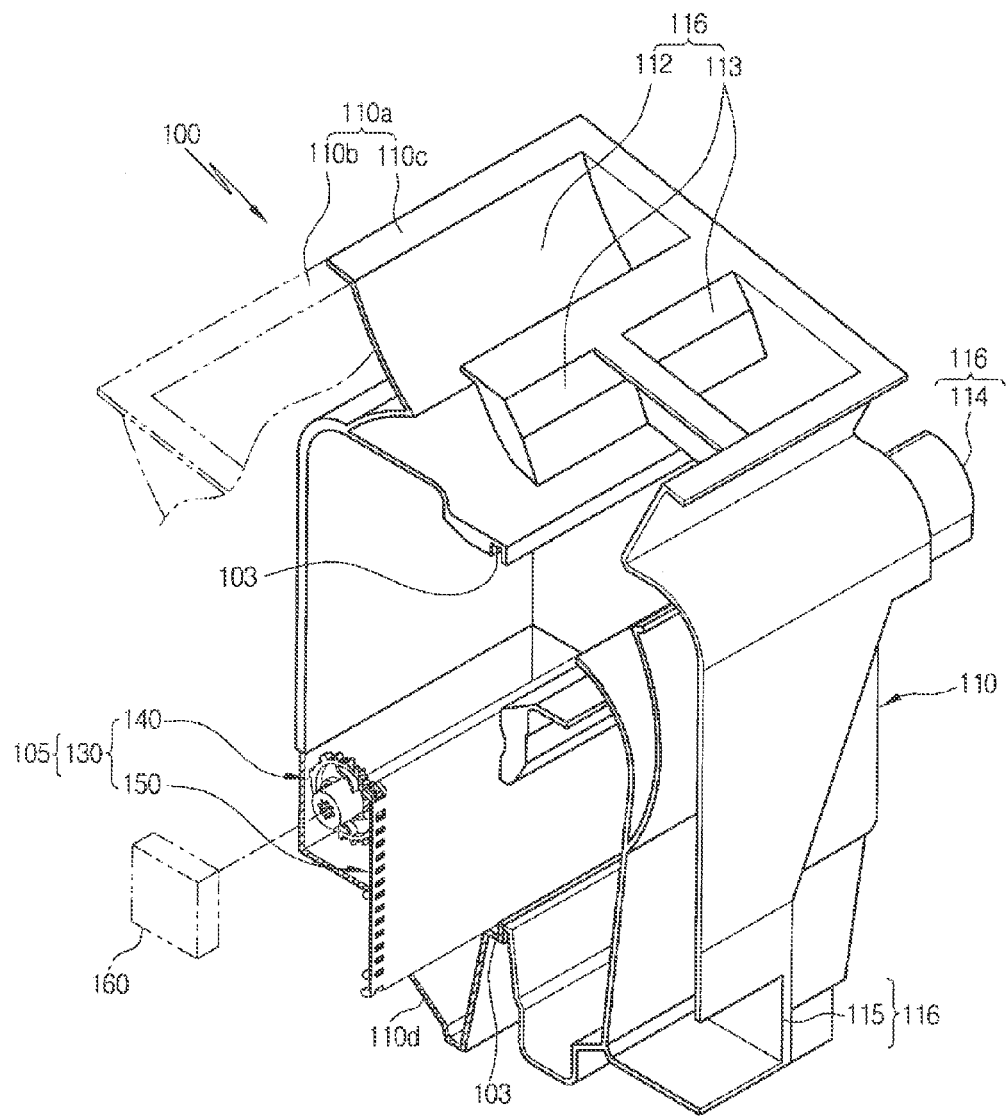
FIG. 3 is a perspective view showing the inside of an air-conditioning case of an air conditioner for a vehicle according to the present invention.
Figure 4:
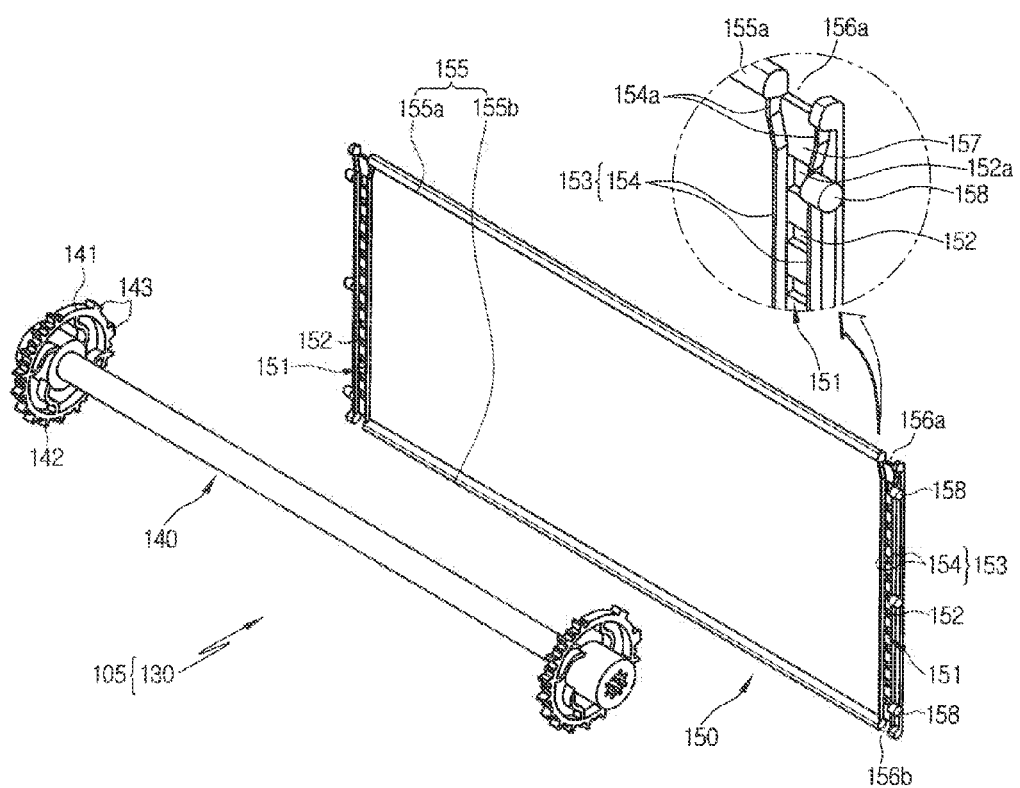
FIG. 4 is an exploded perspective view of the temperature-adjusting door of the air conditioner for the vehicle according to the present invention.
Figure 5:
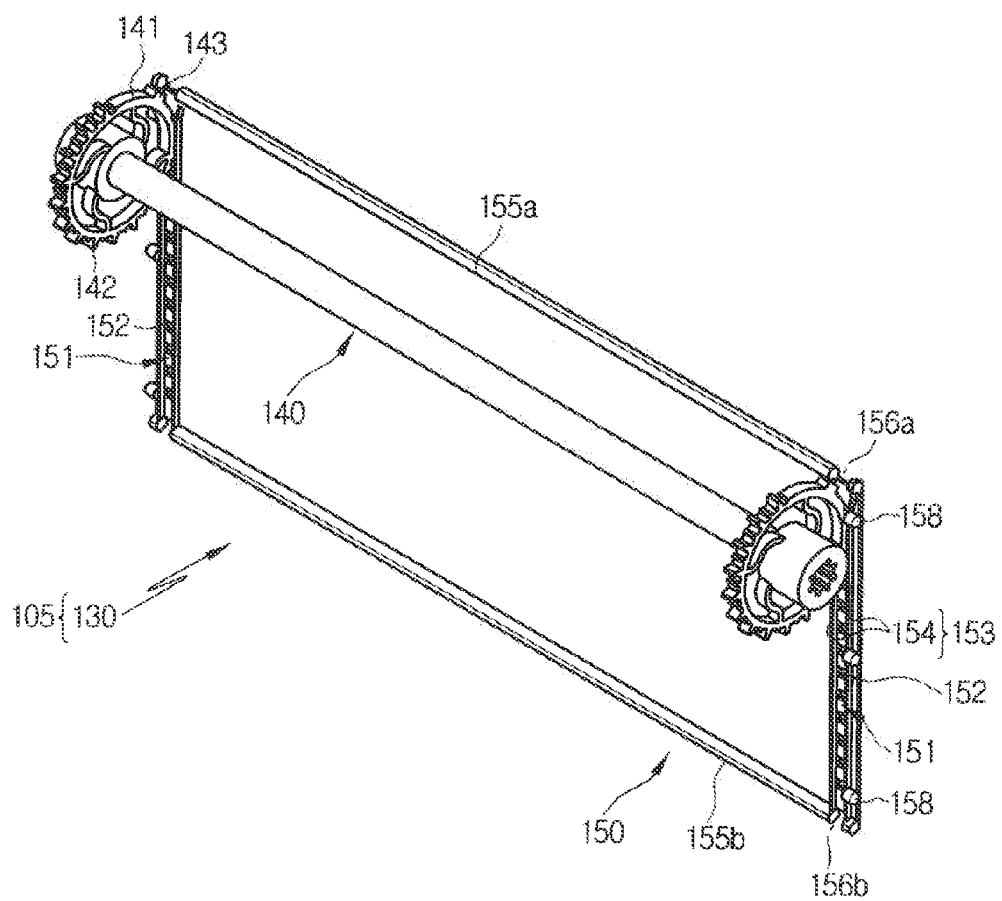
FIG. 5 is a perspective view of the temperature-adjusting door of the air conditioner for the vehicle according to the present invention.

Reference will be now made in detail to the preferred embodiment of the present invention with reference to the attached drawings.

As shown in the drawings, an air conditioner 100 for a vehicle according to the present invention includes: an air-conditioning case 110 having an air inflow port 111 formed on one side thereof and a plurality of air outflow ports 116 formed on the other side thereof for discharging the air, which is introduced through the air inflow port 111; an evaporator 101 and a heater core 102 mounted on an air passageway 110e inside the air-conditioning case 110 and spaced apart from each other at a predetermined interval; doors 105 mounted on the air passageway 110e or the air outflow ports 116 inside the air-conditioning case 110 to control the degree of opening of the air passageway 110e or the air outflow ports 116.

Here, the doors 105 are divided into; a temperature-adjusting door 130 mounted on the air passageway 110e between the evaporator 101 and the heater core 102 inside the air-conditioning case 110 for adjusting the degree of opening of a cold air passageway P1, which bypasses the heater core 102, and a warm air passageway P2, which passes through the heater core 102; and mode doors 120 respectively mounted on the air outflow ports 116 inside the air-conditioning case 110 for adjusting the degree of opening of the plural air outflow ports 116.

Moreover, the air-conditioning case 110 includes: an upper case 110a that is formed by assembling right and left cases 110b and 110c formed separately; and a lower case 110d assembled to the upper case 110a to seal an opened lower portion of the upper case 110a.

Furthermore, a blower (not shown) is mounted on the air inflow port 111 of the air-conditioning case 110 to selectively introduce and blow the inside air or the outside air through an inside air inlet (not shown) or an outside air inlet (not shown) opened and closed by an inside and outside air converting door (not shown).

Additionally, the plural air outflow ports 116 are a defrost vent 112 for discharging the air toward the front window of the vehicle, a face vent 113 for discharging the air toward the face of a passenger, who sits on the front seat, and floor vents 114 and 115 for discharging the air toward the passenger's feet, and the defrost vent 112, the face vent 113 and the floor vents 114 and 115 are formed in order.

The floor vents 114 and 115 are divided into a floor vent 114 for the front seat to discharge the air toward the feet of the passenger, who sits on the front seat, and another floor vent 115 for the rear seat to discharge the air toward the feet, of the passenger, who sits on the rear seat.

In the meantime, a partitioning wall 117 is formed between the warm air passageway P2 and the floor vents 114 and 115 to partition them from each other.

In addition, the temperature-adjusting door 130 and the mode doors 120 are connected to an actuator 160 mounted on the outer surface of the air-conditioning case 110 and rotationally operated to control the degree of opening of the warm and cold air passageways P1 and P2 and the vents 112 to 115.

The temperature-adjusting door 130 of the doors 105 includes a gear shaft 140 and a thin plate member 150.

The gear shaft 140 is rotatably mounted inside the air-conditioning case 110 and has gear portions 141 respectively formed at both end portions thereof, and end portions of the gear shaft 140, which are located more outward, than the gear portions 141, are rotatably joined to both inner sides of the air-conditioning case 110.

In other words, both end portions of the gear shaft 140 are respectively rotatably joined to the opposite sides of the right and left cases 110b and 110c.

Moreover, each of the gear portions 141 of the gear shaft 140 includes a plurality of first gear teeth 142 of the same shape that are formed in a predetermined section in a circumferential direction at equal intervals, and two second gear teeth 143 that are formed in the remaining section and are different in shape from the first gear teeth 142.

In this instance, the two second gear teeth 143 formed in the remaining section are different in shape and interval from the first gear teeth 142.

The reason that the second gear teeth 143 are formed in the shape and at the interval different from the first gear teeth 142 is to assemble the gear shaft 140 and the thin plate member 150 at correct positions when they are assembled with each other.

If the gear portions 141 have only the first gear teeth 142 of the same shape without, having the second gear teeth 142, it is difficult for a worker to check with naked eyes whether or not the gear shaft 140 and the thin plate member 150 are assembled at the correct positions.

Accordingly, in the case that the thin plate member 150 is slidably inserted and mounted into the left and right cases 110b and 110c of the air-conditioning case 110, to which the gear shaft 140 is previously assembled, the worker can conveniently assemble the gear shaft 140 and the thin plate member 150 with each other at the correct positions by interlocking them mutually on the basis of the second gear teeth 143 of the gear portions 141.

For your reference, the gear shaft 140 is operated by the actuator 160 mounted on the outer surface of the air-conditioning case 110. In this instance, when temperature of the air conditioner 100 is controlled, voltage previously inputted in correspondence to the temperature value is applied to the actuator 160, and the actuator 160 rotates the gear shaft 140 as much as the applied voltage, so that the position of the thin plate member 150 is determined.

However, if the gear portions 141 of the gear shaft 140 and the thin plate member 150 are not assembled at the correct positions, even though the actuator 160 normally rotates the gear shaft 140, the thin plate member 150 does not move to the correct position calculated originally but is misplaced, and hence, the indoor temperature of the vehicle is controlled inaccurately.

Therefore, the gear portions 141 of the gear shaft 140 and the thin plate member 150 must be assembled with each other at the correct positions.

The thin plate member 150 slidably moves in interlock with, the gear portions 141 of the gear shaft 140 to thereby control the degree of opening of the cold air passageway P1, which bypasses the heater core 102, and the warm air passageway P2, which passes through the heater core 102.

In this instance, the thin plate member 150 is vertically slidably mounted on the upstream side (front side) of the heater core 102 in an air flow direction inside the air-conditioning case 110, and the gear shaft 140 interlocking with the thin plate member 150 is mounted on the upstream side of the air flow direction that is more upward than the thin plate member 150.

In the meantime, it is preferable that the thin plate member 150 is injection-molded of a plastic material in the form of a flat plate and is formed as thin as it can unless it has problems in operation and durability.

Furthermore, because the single thin plate member 150 is used, the entire structure of the temperature-adjusting door 130 becomes simplified, and hence, it can reduce the number of components, weight and manufacturing costs, enhance durability, and reduce the size of the air conditioner 100. Additionally, the single thin plate member 150 can prevent bad smells caused by inhabitation of molds and is reusable or recyclable.

A lateral edge portion 151 having a plurality of gear holes 152 is formed on at least one end portion of the thin plate member 150 in such a way as to be interlocked with the gear portion 141 of the gear shaft 140.

The lateral edge portions 151 respectively having the plural gear holes 152 are formed at both end portions of the thin plate member 150 in a sliding direction of the thin plate member 150.

Moreover, a rail groove portion 118 is formed on the inner surface of the air-conditioning case 110, which is opposed to the lateral edge portion 151 of the thin plate member 150, in such a way as to slidably support the end portion of the lateral edge portion 151.

Here, the rail groove portions 118 are respectively formed on the inner surfaces of the left and right cases 110b and 110c, which respectively are opposed to the rail portions 151 of the thin plate member 150.

Accordingly, the thin plate member 150 is slidably supported between the rail groove portions 118 formed on the left and right cases 110b and 110c.

Now, a method of assembling the temperature-adjusting door 130 including the gear shaft 140 and the thin plate member 150 to the air-conditioning case 110 will be described. First, the gear shaft 140 is previously mounted and assembled in such a way as to be rotatably supported between the left and right cases 110b and 110c of the upper case 110a.

As described above, after the gear shaft 140 is previously assembled between the left and right cases 110b and 110c, the thin plate member 150 is slidably inserted through the opened lower portion of the upper case 110a and is interlocked with the gear portions 141 of the gear shaft 140.

In this instance, rail groove portions 118 are formed on the left and right cases 110b and 110c of the upper cases 110a for allowing a sliding joining of the thin plate member 150. Before the lower case 110d is assembled, the lower portions of the rail groove portions 118 are opened.

Accordingly, the thin plate member 150 is slidably assembled through the opened lower portions of the rail groove portions 118 of the left and right cases 110b and 110c, and in this instance, one end portion (front, end portion) of the lateral edge portion 151 of the thin plate member 150 slidably assembled along the rail groove portions 118 gets in contact with the second gear teeth 143 of the gear portion 141 of the gear shaft 140. After that, when the thin plate member 150 is continuously slides, the gear portion 141 of the gear shaft 140 is rotated, and then, from the second gear teeth 143 of the gear portion 141, the gear portion 141 starts to be interlocked with the gear holes 152 of the lateral edge portion 151.

Moreover, the lateral edge portion 151 of the thin plate member 150 includes separation preventing means 153 adapted to prevent the gear portion 141 being in interlock with the gear holes 152 of the lateral edge portion 151 from being separated and to guide the gear portion 141 is smoothly interlocked with the gear holes 152.

The separation preventing means 153 is formed by guide ribs 154 respectively protruding from both sides of the gear holes 142 along the lateral edge portion 151. That, is, a pair of guide ribs 154 are formed on the lateral edge portion 151.

In this instance, the guide ribs 154 protruding from both sides of the gear holes 152 are formed along the lateral edge portion 151 so as to guide that the gear portion 141 of the gear shaft 140 is smoothly interlocked with the gear holes 152 of the lateral edge portion 151 and to prevent the gear portion 141 interlocked with the gear holes 152 of the lateral edge portion 151 from being separated from the gear holes 152 during the operation.

Furthermore, when the guide ribs 154 are formed at both sides of the gear holes 152, it can prevent the gear holes 152 of the thin plate member 150 from being dislocated when the gear holes 152 are interlocked with the gear portion 141 of the gear shaft 140.

Additionally, the guide ribs 154 of the lateral edge portion 151 respectively have guide portions 154a getting gradually wider in interval therebetween at an area of the lateral edge portion 151 where the gear portion 141 is assembled in such a fashion that the gear portion 141 of the gear shaft 140 is guided smoothly.

As described above, a gap between the guide ribs 154 becomes wider by the guide portions 154a formed at end portions of the guide ribs 154 formed on both sides of the gear holes 152, whereby when the thin plate member 150 is slidably assembled to the inside of the upper case 110a to which the gear shaft. 140 is assembled in advance, the gear portion 141 of the gear shaft 140 can be easily guided and assembled to the gear holes 152 of the lateral edge portion 151.

In addition, the thin plate member 150 further includes bending portions 155 formed at both end portions of the sliding direction and bended in one direction to thereby prevent the thin plate member 150 from being transformed by wind pressure when the air flowing inside the air-conditioning case 110 is bumped against the thin plate member 150.

The bending portions 155 may be inclined at a predetermined angle on the both end portion or bent with a bended surface.

In the meantime, a sealing groove 103 is formed on the inner face of the air-conditioning case 110 to provide sealing performance when the bending portions 155 formed at both end portions of the thin plate member 150 are inserted in the case of the greatest cooling mode or the greatest heating mode.

When the bending portions 155 are formed at both end portions of the thin plate member 150, strength of the thin plate member 150 is enhanced, and it can prevent bending or transformation of the thin plate member 150 by wind pressure inside the air-conditioning case 110, and hence, it can solve the problem that both end portions of the thin plate member 150 are caught to the sealing groove 103 of the air-conditioning case 110 when the thin plate member 150 vertically slides inside the air-conditioning case 110.

Moreover, one of the bending portions 155 has an introduction portion 156a formed by the bending portion 155a that is partially cut, so that the gear portion 141 of the gear shaft 140 can be smoothly introduced into the lateral edge portion 151 of the thin plate member 150 when the thin plate member 150 is slidably mounted inside the air-conditioning case 110.

That is, in the state where the bending portions 155 are formed at both end portions of the thin plate member 150, when the thin plate member 150 slides into the air-conditioning case 110 and is assembled with the gear portions 141 of the gear shaft 140, it may be difficult that the gear portions 141 are introduced into the lateral edge portions 151 of the thin plate member 150.

Accordingly, when the bending portion 155a is partially cut to form the introduction portion 156a, the gear portions 141 of the gear shaft 140 are smoothly inserted into the lateral edge portions 151 of the thin plate member 150, which is assembly by being pushed into the air-conditioning case 110, so that assemblability between the gear shaft 140 and the thin plate member 150 is enhanced.

Additionally, the introduction portion 156a is formed at one of the bending portions 155 formed at both end portions of the thin plate member 150, and in this instance, is formed on the same line and formed at one end portion of the lateral edge portion 151.

Meanwhile, on the other bending portion 155b opposed to the bending portion 155a on which the introduction portion 156a is formed, a cut portion 156b is formed on the same line as the lateral edge portion 151 and is formed by the bending portion 155b which is partially cut. The cut portion 156b is in point contact with one side of the rail groove portion 118 to thereby minimize the friction between the thin plate member 150 and the rail groove portion 118. Further, the cut portion 156b has bilateral symmetry to thereby prevent transformation due to a difference in curing velocity at the time of injection-molding.

In addition, the first gear holes 152a formed at one end portion of the lateral edge portion 151 have the shape corresponding to the second gear teeth 143 in order to interlock with the second gear teeth 143. In this instance, the gear holes 152 except for the first gear hole 152a formed on the lateral edge portion 151 have the shape corresponding to the first gear teeth 142.

Figure 6:
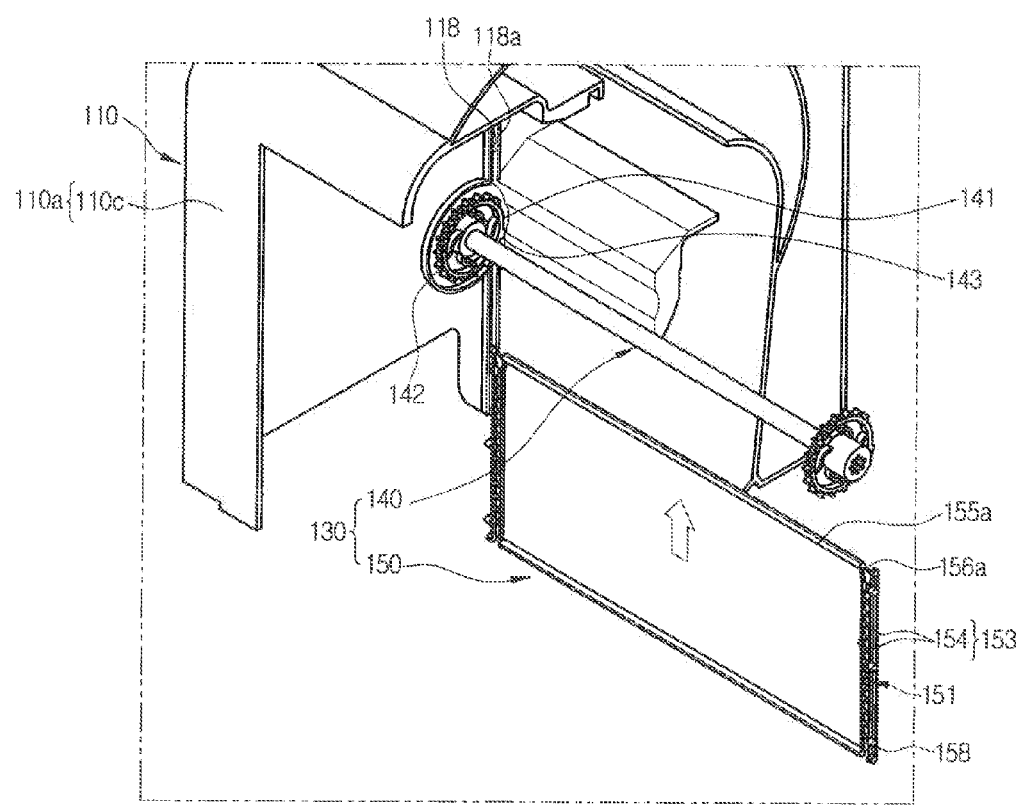
FIGS. 6 and 7 are perspective views showing the state where a thin plate member is slidably assembled into the air-conditioning case, to which a gear shaft is assembled in advance.
Figure 7:
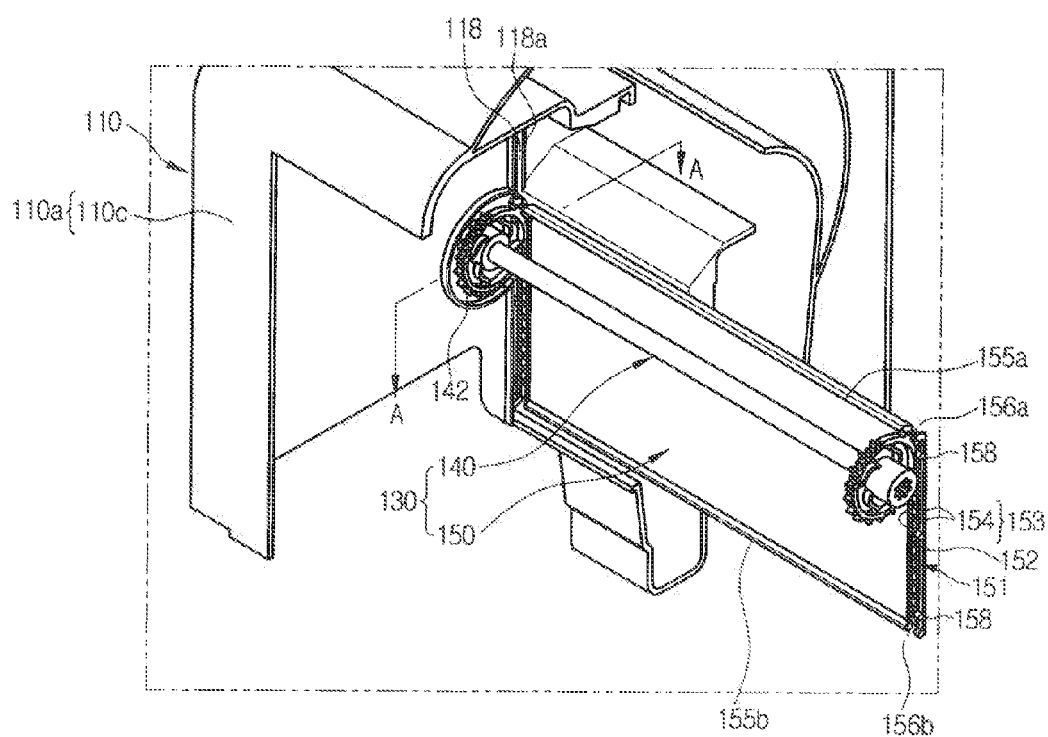
Figure 8:
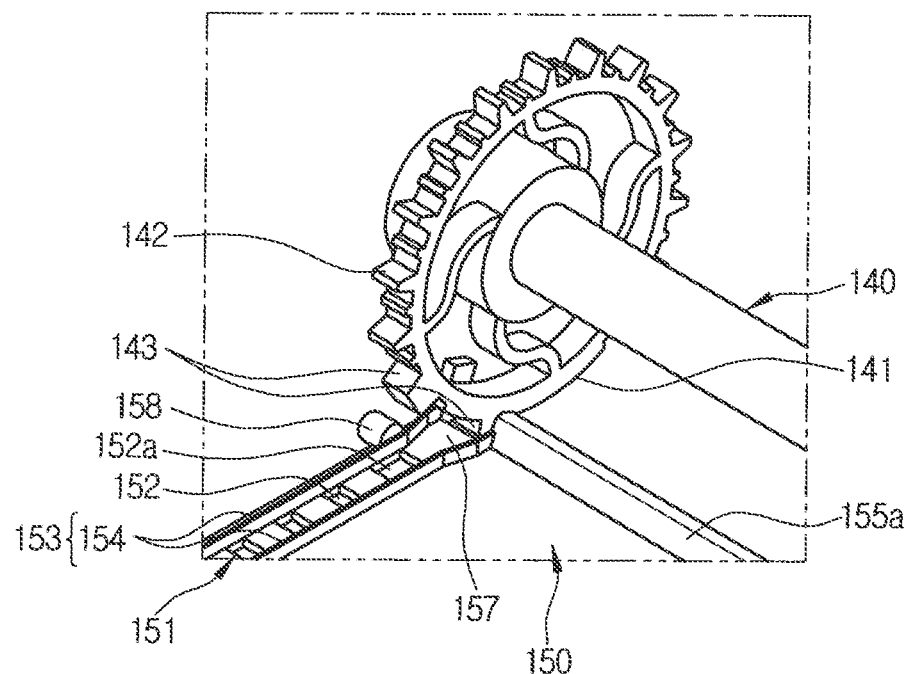
FIGS. 8 and 9 are perspective views showing the process that a gear portion of the gear shaft, is interlocked with gear holes of a lateral edge portion through an introduction portion of the thin plate member.
Figure 9:
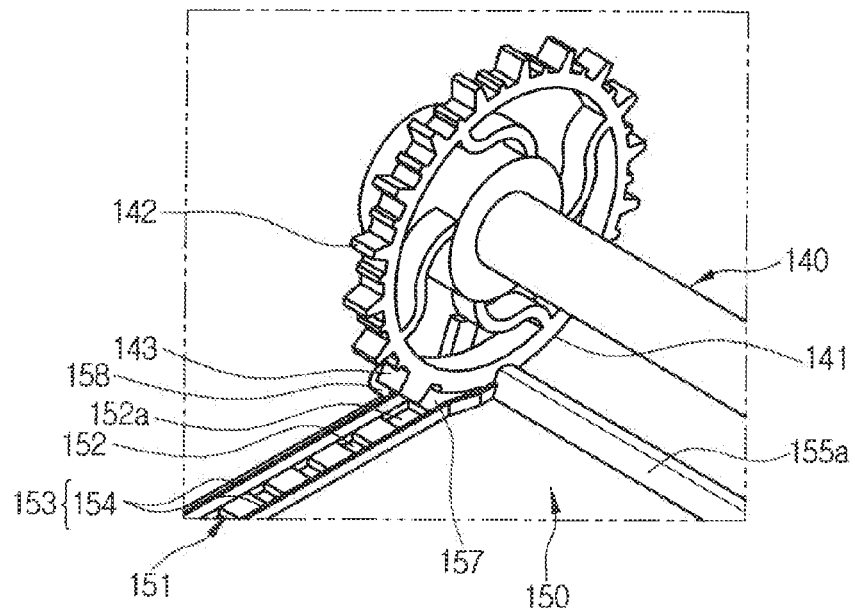

Name, as shown in FIGS. 6 and 7, when the thin plate member 150 is pushed and assembled into the air-conditioning case 110, as shown in FIG. 8, one of the two gear teeth 143 formed on the gear portion 141 is caught to one end portion of the lateral edge portion 151, and hence, as shown in FIG. 9, only the other one of the second gear teeth 143 is interlocked with the first gear hole 152a of the lateral edge portion 151.

Therefore, only the first gear hole 152a of the lateral edge portion 151 must have the shape corresponding to the second gear teeth 143.

Moreover, because one of the two second gear teeth 143 is caught to the end portion of the lateral edge portion 151 and the other one is interlocked with the first gear hole 152a, a tooth interval portion 157 is formed between one side of the first gear hole 152a, namely, one end portion of the lateral edge portion 151, and the first gear hole 152a in correspondence to an interval between the two second gear teeth 143.

Meanwhile, the tooth interval portion 157 may be formed not only at one end portion but also at the other end port ion of the lateral edge portion 151.

Furthermore, in order to minimize friction between the rail groove portion 118 of the air-conditioning case 110 and the thin plate member 150, a width (W) of the rail groove portion 118 is larger than a thickness of the thin plate member 150, and a plurality of protrusions 158 are formed on one side of the lateral edge portion 151 of the thin plate member 150 inserted into the rail groove portion 118 and are in slidable contact with one side of the rail groove portion 118.

In this instance, the protrusions 158 are spaced apart from each other at predetermined intervals along the lateral edge portion 151 of the thin plate member 150.

Accordingly, when the thin plate member 150 slides, the plural protrusions 158 formed on the lateral edge portion 151 of the thin plate member 150 get in point contact with one side of the rail groove portion 118, so that friction between the thin plate member 150 and the rail groove portion 118 is minimized, and hence, it can reduce a load of the actuator 160 operating the thin plate member 150 and the gear shaft 140.

Additionally, the bending portion 155 described above is bended in a direction that the protrusions 158 are protruded from the thin plate member 150.

Figure 11:
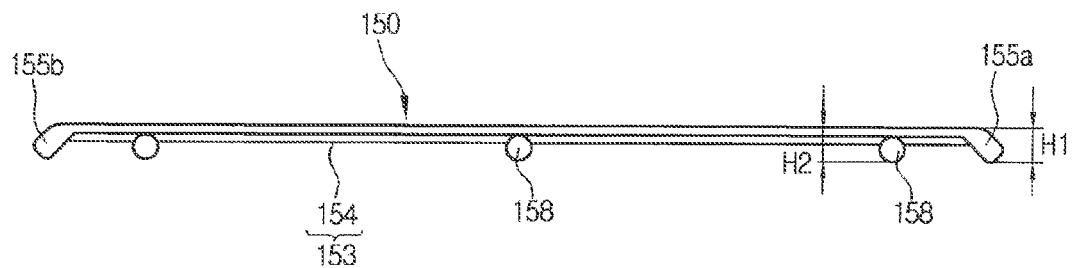
FIG. 11 is a side sectional view of the thin plate member of the air conditioner according to the present invention.

In this instance, as shown in FIG. 11, based on the side of the thin plate member 150 opposed to the gear shaft 140, a height (H1) of the bending portion 155 is equal to or smaller than a height (H2) of the protrusions 158.

In other words, because not only the protrusions 158 but also some portion of the bending portion 155 are inserted into the rail groove portion 118, there is no interference with the rail groove portion 118 when the height (H1) of the bending portion 155 is equal to or smaller than the height (H2) of the protrusions 158.

Moreover, it is preferable that the face of the protrusions 158 and the face of the bending portions 155, which are in slidable contact with the rail groove portion 118 are formed in a round shape to thereby reduce contact areas.

In this instance, the protrusion portions 158 are formed in a cylindrical shape as shown in the drawings.

Figure 10:
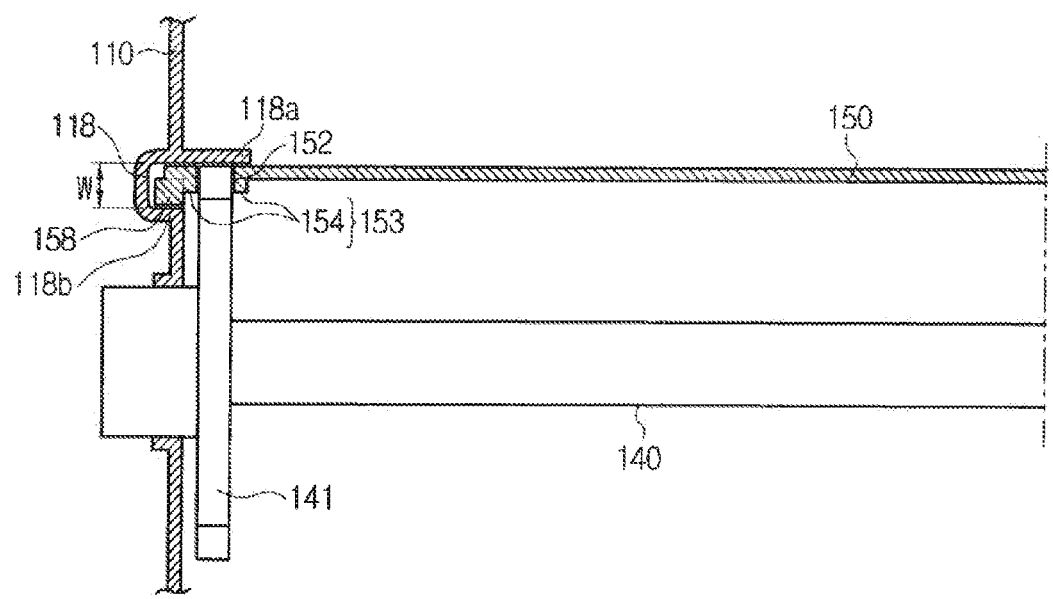
FIG. 10 is a sectional view taken along the line of A-A of FIG. 7.

As shown in FIG. 10, a sealing wall 118a is protrudingly formed on one side of the rail groove portion 118 and the inner surface of the air-conditioning case 110 in such a way as to cover the gear holes 152 formed on the lateral edge portion 151 of the thin plate member 150, so that it can prevent that air leaks through the gear holes 152 of the thin plate member 150.

In this instance, the sealing wall 118a is closely formed on one side of the lateral edge portion 151 of the thin plate member 150 to thereby close the gear holes 152 of the thin plate member 150.

Furthermore, the sealing wall 118a is opposed to the gear shaft 140 relative to the thin plate member 150 in order to prevent interference from the gear portion 141 of the gear shaft 140.

Additionally, while the sealing wall 118a protrudes from the side of the rail groove portion 118 to the inside of the air-conditioning case 110, the seal wall 118a is not formed at the other side of the rail groove portion 118 to prevent interference with the gear portion 141. In other words, the rail groove portion 118 has only an internal sealing wall 118b formed on the other side of the rail groove portion 118 without, the sealing wall 118a, but the internal sealing wall 118b does not protrude toward the inside of the air-conditioning case 110.

Here, the protrusions 158 of the thin plate member 150 slidably move in a state where they are seated on the internal sealing wall 118b of the rail groove portion 118.

In the meantime, the mode doors 120 for opening and closing the air outflow ports 116 may be constituted of a gear shaft 121 and a thin plate member 122 like the temperature-adjusting door 130 in order to reduce the size of the air conditioner 100. That is, the mode door 120 includes the gear shaft 121 that is rotated by the actuator (not shown) and the thin plate member 122 that is interlocked with the gear shaft 121 and slidably moves inside the air-conditioning case 110 to open and close the air outflow ports 116 when the gear shaft 121 is rotated.

As shown in the drawings, the thin plate member 122 of the mode door 120 is formed in a bended shape.

Hereinafter, an assembly process of the air conditioner for the vehicle according to the present invention will be described, but in this specification, just an assembly process of the temperature-adjusting door 130 will be described.

First, in a state where the gear shaft. 140 is located between the left and right cases 110b and 110c of the upper case 110a, the left and right cases 110b and 110c are assembled with each other.

The lower portion of the upper case 110a to which, the gear shaft 140 is previously assembled is in an opened state because the lower case 110d is not yet assembled, and in this instance, also the lower portions of the rail groove portions 118 formed on the opposite faces of the left and right cases 110b and 110c are also opened.

After that, the lateral edge portions 151 of the thin plate member 150 are inserted, and slidably assembled through the opened lower portions of the rail groove portions 118 formed on the left and right cases 110b and 110c. In this instance, in the case of the thin plate member 150 slidably assembled along the rail holes, the one end portion (front end portion) of the lateral edge portion 151 is in close contact with one of the second gear teeth 143 (front second gear tooth) formed on the gear portion 141 of the gear shaft 140, and then, when the thin plate member 150 is continuously slid, the gear portion 141 of the gear shaft 140 is rotated and interlocked with the gear holes 152 of the lateral edge portion 151, starting from the other one of the second gear teeth 143 of the gear portion 141.

As described above, because the worker can easily check the two second gear teeth 143, which are different in shape and interval from the plural first gear teeth 142 of the gear portion 141, with the naked, eyes, when the worker slidably assembles the thin plate member 150 along the rail groove portions 118 of the left and right cases 110b and 110c by pushing the thin plate member 150 with hands, the work makes one end portion of the lateral edge portion 151 of the thin plate member 150 be caught only to the front second gear tooth 143 out of the two second gear teeth 143, then, the thin plate member 150 can be easily assembled at the correct position.

Here, because the introduction portion 156a is formed at one end portion of the lateral edge portion 151 of the thin plate member 150 and the guide ribs 154 are formed at both sides of the gear holes 152 of the lateral edge portion 151, the gear portion 141 of the gear shaft 140 can be easily inserted and interlocked into the gear holes 152 of the lateral edge portion 151, and hence, it increases assemblability.

After that, when the assembly of the thin plate member 150 to the upper case 110a is finished, the lower case 110d is assembled to the lower portion of the upper case 110a.

Hereinafter, a cooling mode and a heating mode, which are representative modes of air-conditioning modes using the temperature-adjusting door 130, will be described.

A. Cooling Mode

Figure 12:
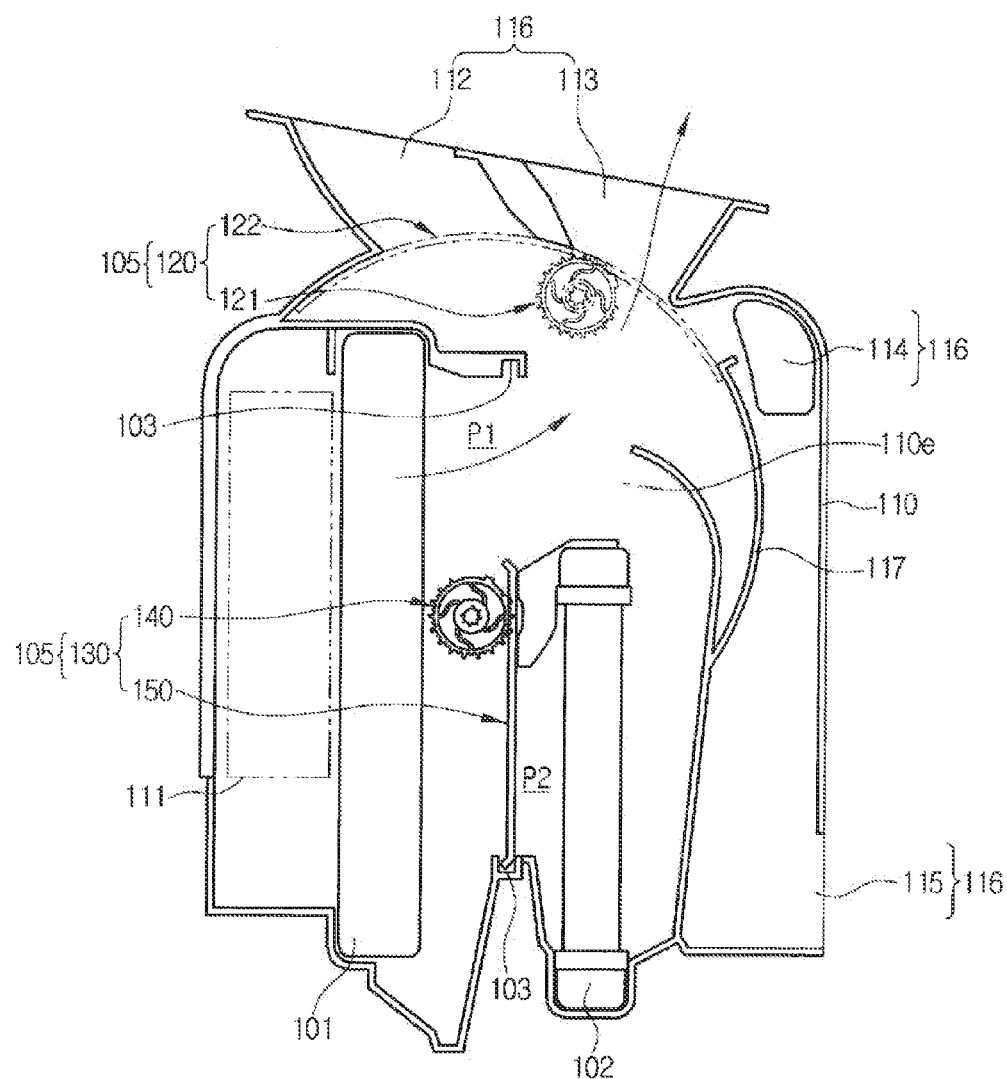
FIG. 12 is a sectional view showing a cooling mode in the air conditioner according to the present invention.

As shown in FIG. 12, in the case of the cooling mode, the thin plate member 150 downwardly slides by operation of the gear shaft 140 of the temperature-adjusting door 130, and thereby, the cold air passageway P1 is opened and the warm air passageway P2 is closed.

Accordingly, the air blown by a blower (not shown) is converted into a cold air while passing through the evaporator 101.

The cold air cooled while passing through the evaporator 101 bypasses the heater core 102 through the cold air passageway P1 opened by the temperature-adjusting door 130, and then, is discharged to a specific air outflow port 116 opened by the mode door 120 to thereby cool the inside of the vehicle.

B. Heating Mode

Figure 13:
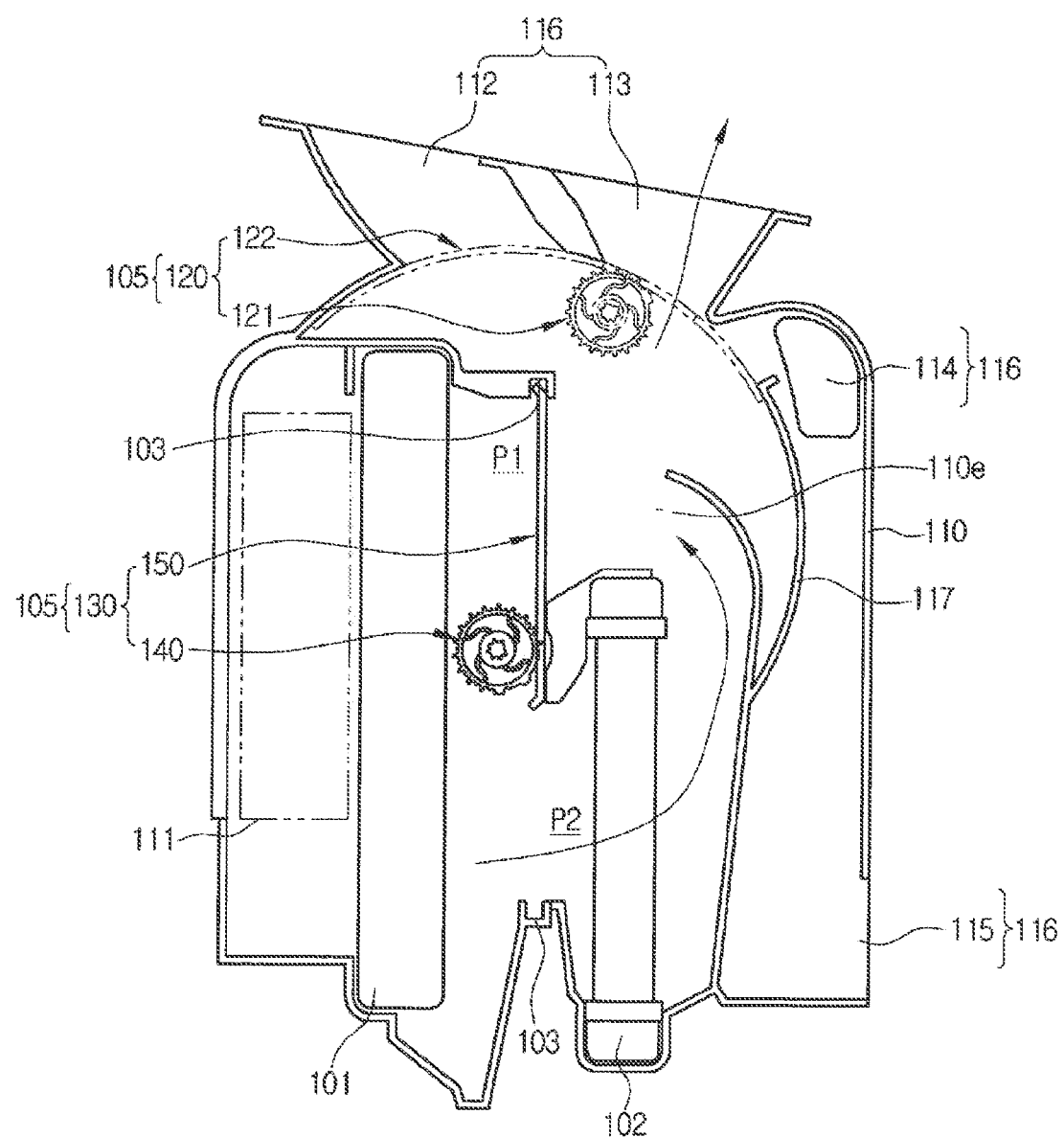
FIG. 13 is a sectional view showing a heating mode in the air conditioner according to the present invention.

As shown in FIG. 13, in the case of the heating mode, the thin plate member 150 upwardly slides by operation of the gear shaft 140 of the temperature-adjusting door 130, and thereby, the cold air passageway P1 is closed and the warm air passageway P2 is opened.

Accordingly, the air blown by a blower (not shown) is converted into a warm air through heat-exchange with the heater core 102 while passing through warm air passageway P2 opened by the temperature-adjusting door 130 after passing through the evaporator 101, and then, is discharged to a specific air out flow-port 116 opened by the mode door 120 to thereby heat the inside of the vehicle.

As described above, while the structure that the separation preventing means 153 is formed on the lateral edge portion 151 of the thin plate member 150 is applied to the semi-center type air conditioners, the present invention is not restricted to the above, but may be applied to various kinds of air conditioners, such as center-mounting type air conditioners, three-piece type air conditioners, independent type air conditioners, and other type air conditioners, in the same way, and it can provide the same effects as the structure applied to the semi-center type air conditioners.

What is claimed is:

1. An air conditioner for a vehicle comprising:
an air-conditioning case having an air inflow port formed on one side thereof and a plurality of air outflow ports formed on the other side thereof for discharging air which is introduced through the air inflow port;
doors each having a gear shaft rotatably mounted inside the air-conditioning case and a plate member slidably mounted inside the air-conditioning case to control degree of opening of the air outflow ports or an air passageway inside the air-conditioning case, the gear shaft including gear portions, the plate member including lateral edge portions each of which is formed on at least one end portion of the plate member and the lateral edge portions each having a plurality of gear holes through the lateral edge portions in such a way as to be interlocked with the gear portions of the gear shaft; and
separation preventing means formed on the lateral edge portion of the plate member preventing the gear portion interlocked with the gear holes of the lateral edge portion from being separated from the gear hole and guiding the gear portion to be smoothly interlocked with the gear holes, and wherein the separation preventing means is constructed of guide ribs respectively protruding from the lateral edge portions on each side of the gear holes along the lateral edge portion, and wherein, at end portions of the guide ribs, guide portions are formed that create an outwardly widening gap between the guide ribs of the rail portion respectively have guide portions, in which a gap between the guide ribs is widened outwardly, at an area of the lateral edge portion where the gear portion is assembled.

2. The air conditioner according to claim 1, wherein the plate member comprises bending portions formed at both end portions of the plate member, both end portions being orthogonal to the lateral edge portions, wherein the bending portions enhance the strength of the thin plate member.

3. The air conditioner according to claim 2, wherein one of the bending portions has an introduction portion formed by the bending portion that is partially cut, so that the gear portion of the gear shaft can be smoothly introduced into the lateral edge portion of the plate member when the plate member is slidably mounted inside the air-conditioning case to which the gear shaft is previously assembled.

4. The air conditioner according to claim 3, wherein a cut portion is formed on the other bending portion opposed to the bending portion, on which the introduction portion is formed, on the same line as the lateral edge portion and is formed by the bending portion which is partially cut.

5. The air conditioner according to claim 1, wherein each of the gear portions of the gear shaft comprises: a plurality of first gear teeth of the same shape that are formed in a predetermined section in a circumferential direction at equal intervals; and two second gear teeth that are formed in the remaining section and are different in shape from the first gear teeth.

6. The air conditioner according to claim 1, wherein each of the gear portions of the gear shaft comprises: a plurality of first gear teeth of the same shape that are formed in a predetermined section in a circumferential direction at equal intervals; and two second gear teeth that are formed in the remaining section and are formed at a different interval from the first gear teeth.

7. The air conditioner according to claim 5, wherein the first gear holes formed at one end portion of the lateral edge portion have the shape corresponding to the second gear teeth in order to interlock with the second gear teeth.

8. The air conditioner according to claim 6, wherein a tooth interval portion is formed on one side of the first gear hole formed on one end portion of the lateral edge rail portion and corresponds to an interval between the two second gear teeth.

9. The air conditioner according to claim 1, wherein a rail groove portion is formed on the inner surface of the air-conditioning case, which is opposed to the rail portion of the plate member, in such a way as to slidably support the end portion of the rail portion, and wherein in order to minimize friction between the rail groove portion of the air-conditioning case and the plate member, a width of the rail groove portion is larger than a thickness of the plate member, and a plurality of protrusions are formed on one side of the rail portion of the plate member inserted into the rail groove portion and are in slidable contact with one side of the rail groove portion.

10. The air conditioner according to claim 1, wherein the plate member further comprises a plurality of protrusions formed on one side of the lateral edge portion of the plate member, wherein the protrusions are spaced apart from each other at predetermined intervals along the lateral edge portion of the plate member.

11. The air conditioner according to claim 1, wherein the plate member further comprises bending portions formed at both end portions of the plate member, both end portions being orthogonal to the lateral edge portions, and a plurality of protrusions formed on one side of the lateral edge portion of the plate member, wherein the bending portions enhance the strength of the thin plate member, and wherein the bending portions are bended in a direction that the protrusions protrude from the plate member.

12. The air conditioner according to claim 1, wherein the plate member further comprises bending portions formed at both end portions of the plate member, both end portions being orthogonal to the lateral edge portions, and a plurality of protrusions formed on one side of the lateral edge portion of the plate member, wherein the bending portions enhance the strength of the thin plate member, and wherein based on the side of the plate member opposed to the gear shaft, a height of the bending portion is equal to or smaller than a height of the protrusions.

13. The air conditioner according to claim 1, wherein the plate member further comprises bending portions formed at both end portions of the plate member, both end portions being orthogonal to the lateral edge portions, and a plurality of protrusions formed on one side of the lateral edge portion of the plate member, wherein the bending portions enhance the strength of the thin plate member, and wherein the protrusions and the bending portions, which are in slidable contact with a rail groove portion are formed in a round shape to thereby reduce contact areas.

14. The air conditioner according to claim 9, wherein
a sealing wall is protrudingly formed on one side of the rail groove portion and on the inner surface of the air-conditioning case in such a way as to cover the gear holes formed on the rail portion of the plate member so as to prevent air from leaking through the gear holes.

15. The air conditioner according to claim 1, wherein the air-conditioning case comprises: an upper case that is formed by assembling right and left cases formed separately; and a lower case assembled to the upper case to seal an opened lower portion of the upper case,
wherein the gear shaft of the door is rotatably supported and mounted between the left and right cases of the upper case, and
wherein the plate member of the door is slidably inserted through the opened lower portion of the upper case, to which the gear shaft is previously assembled, and is interlocked with the gear portions of the gear shaft.

* * * * *